April 16, 1940.  A. I. APPLETON  2,197,737
GROUNDING DEVICE FOR CONNECTION BOXES
Filed May 24, 1939
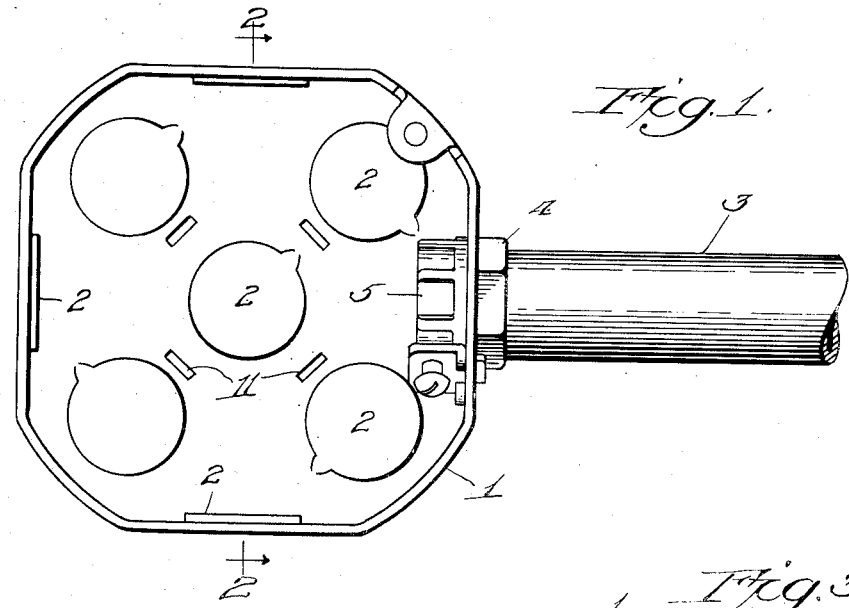
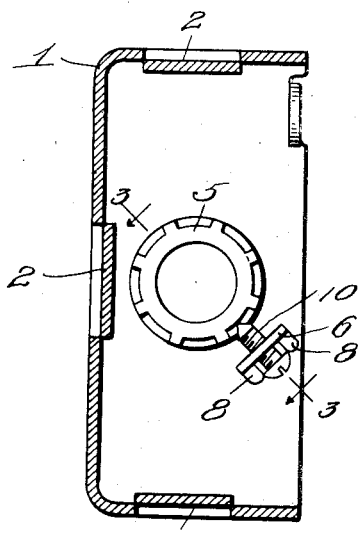
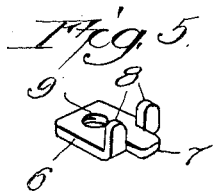
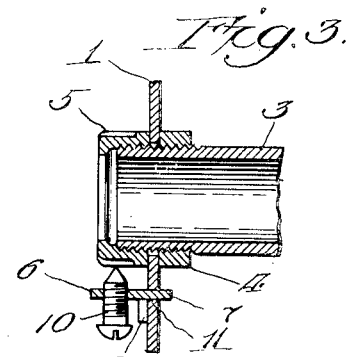
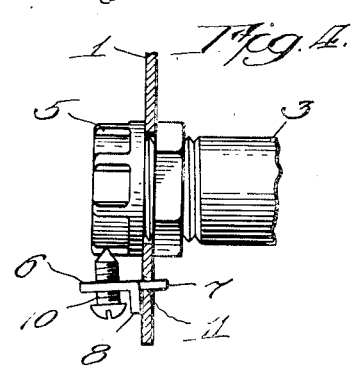
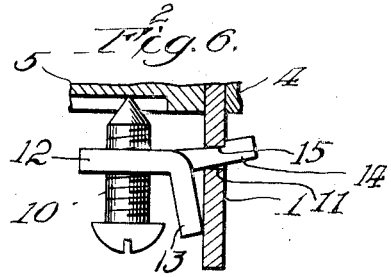
Inventor:
Arthur I. Appleton,
By Wm. F. Freudenreich
Atty.

Patented Apr. 16, 1940

2,197,737

UNITED STATES PATENT OFFICE 2,197,737

GROUNDING DEVICE FOR CONNECTION BOXES

Arthur I. Appleton, Chicago, Ill., assignor to Appleton Electric Company, a corporation of Illinois Application May 24, 1939, Serial No. 275,372

5 Claims. (Cl. 174—51)

The conduits for housing current-carrying conductors in electrical distribution systems for buildings must be grounded. In order to make the grounding effective, it is essential that there be a good electrically-conductive path between each conduit and the connection box or boxes to which it is joined. The usual manner of fastening a conduit to a box is to insert the conduit through a knock-out opening and place on the conduit nuts or bushings that engage with opposite sides of the wall through which the conduit passes, so as to clamp the wall between them. This mechanical connection does not, with sufficient certainty, provide a good electrically-conductive path between the box wall and the conduit and, therefore, special means are usually provided to insure the existence of such a path.

The object of the present invention is to provide a simple and novel means for insuring a good electrically-conductive connection between a metal conduit and a metal wall through which the conduit passes.

It sometimes happens that the nut or bushing that is screwed upon the end of a conduit on the inner side of a box becomes loose and drops off, permitting the conduit and the box to separate from each other. In carrying out my invention, I utilize a screw that bites into the periphery of such nut or bushing radially of the axis thereof, causing it to act as a positive lock to prevent turning or other movements of the nut or bushing unless the conduit be completely unscrewed therefrom. Therefore, viewed in one of its aspects, the present invention may be said to have for its object to produce a simple and novel grounding device between a conduit and a wall and a lock for the nut or bushing on the conduit engaged with one side of the wall.

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a top plan view of an ordinary outlet box, with the cover removed, attached to one end of a conduit, and equipped with one of my improved grounding and nut lock devices; Fig. 2 is a section on line 2—2 of Fig. 1; Fig. 3 is a section on line 3—3 of Fig. 2, illustrating the conditions which exist before the screw of the grounding device is engaged with the nut or bushing on the conduit; Fig. 4 is a view similar to Fig. 3, showing the screw tightened against the nut or bushing, as in Fig. 2; Fig. 5 is a perspective view of the screw-carrying ear which, in its preferred form, is separate from the box wall; and Fig. 6 is a sectional view similar to Fig. 4, but showing smaller parts of the box and nuts or bushings, illustrating a modification.

Referring to the drawing, 1 represents any usual or suitable outlet or connection box containing any usual or suitable arrangement of knockouts 2 in the bottom and side walls. A conduit 3 is shown as extending through one of the knockout openings in a side wall of the box. The conduit and wall are shown as being fastened together mechanically, in the usual way, by a nut 4 screwed upon the conduit on the outer side of the wall, and a nut or bushing 5 screwed upon the end of the conduit projecting beyond the opposite side of the wall, namely into the interior of the box.

In accordance with my invention, I provide, or make it possible to provide, the box with inwardly-projecting ears beside one or all of the knockouts; each ear having a screw having a pointed end that may be caused to bite into the periphery of the nut or bushing on the inner end of a conduit entering the box through the adjacent knockout opening. In the arrangement shown, the ears are shown as being pieces separate from the box, so that any box need have only as many ears as there are conduits connected to the box; whereas, if the ears be fixed to the box by the manufacturer, it is necessary to provide as many ears as there are knockouts, in order to permit proper grounding of the box if only a single conduit be connected thereto at any one of the knockout openings.

The ear 6 illustrated consists simply of a small rectangular plate slot inwardly from one edge along separated lines and having the portions outwardly from the slots bent in the same direction at right angles to the body of the plate; thereby leaving the plate with a narrow, central tongue 7 projecting from one end between a pair of laterally projecting lugs 8. The unmutilated portion of the plate is provided with a screw-threaded hole 9 into which is screwed a screw 10 having a pointed end. In the manufacture of the box small rectangular holes or slots 11 are punched into the box walls beside the knockouts; these holes or slots being of a size to permit the tongues 7 on the ears or clips 6 to be easily inserted.

A user having a properly prepared box and a supply of grounding devices simply inserts the tongue of one of the devices into each of the slots adjacent to a conduit that has been connected to the box; the lugs 8 on the device pointing away from the conduit and engaged with the inner side of the box wall. The heads of the screws lie on the same side of the devices as do the lugs so that, when a device is applied to a box wall beside a conduit, the pointed end of the screw is directed toward the nut or bushing 5. The parts are preferably so positioned that each screw will be approximately radial with respect to the adjacent conduit, as shown; thereby preventing the screw from exerting any turning effort on the nut or bushing when the screw is tightened, and causing the screw to become a positive stop to lock the nut against turning, even though the point of the screw presses only slightly into the metal of the nut or bushing.

In Fig. 3 one of the devices is illustrated as having just been placed in position beside a conduit. Upon turning the screw, its point engages with the periphery of the nut or bushing 5, and the pressure exerted by the screw then results in driving its point into the metal of the nut or bushing and in canting the ear member, as indicated in Fig. 4. The canting movement of the ear is resisted in part by the lugs 8 and in part by the tongue 7 which is pressed against the sharp edge on one side of the hole or slot in the plane of the outer surface of the box wall, and against the sharp edge on the opposite side of the hole or slot in the plane of the inner face of the box wall; these edges biting into the opposite faces of the tongue and insuring a good electrically-conductive connection between the ear and the box wall. Therefore, since the point of the screw, in forcing its way into the metal of the nut or bushing, effects a good electrically-conductive connection between itself and the conduit, a good electrically-conductive path is produced from the box wall to the conduit.

It will thus be seen that I have produced a simple and novel construction and arrangement for effectively grounding a connection box or the like to a conduit or a number of conduits that may be fastened thereto, and at the same time prevent the loosening and dropping off of the bushings that are usually screwed upon the ends of the conduits projecting into outlet boxes. It will also be seen that in its preferred form, a box need not be provided with more than a single grounding device if there be only a single conduit, regardless of the knockout opening through which the conduit enters the box, so that the box itself is just like an ordinary box except for the presence of the additional small holes or slots.

If desired, the detachable ear or clip may be so fashioned as to be interlocked more effectively against being displaced by a blow or bump against the outer end of the tongue 7 than is the particular form heretofore described. Thus, in Fig. 6, there is shown a clip 12 whose legs 13, corresponding to the legs 8 in the other form, make an obtuse angle with the body portion while the tongue 14 make a slight angle with the body portion and has in the top thereof a notch 15 extending crosswise of the same. The notch is at the base of the tongue so that when the tongue is inserted in the hole 11 in the box wall, with the notch on the side toward the nut or bushing 4, the adjacent edge of the box wall is engaged in the notch as soon as the point of the screw is brought into contact with the nut 5, as indicated in Fig. 6. Further turning of the screw then causes the point of the latter to bite into the nut 5 and the body portion of the clip or ear and its tongue to be flattened more or less, while the legs 13 are bent until they lie more nearly at right angles to the body portion. In any event, a blow on the outer end of the tongue will not be effective to drive the tongue inwardly through the hole, unless the tongue be first pried laterally to free the wall edge from the notch.

While I have illustrated and described with particularity only a single preferred form of my invention, with a slight modification I do not desire to be limited to the exact structural details thus illustrated and described; but intend to cover all forms and arrangements which come within the definitions of my invention constituting the appended claims.

I claim:

1. A grounding device for use in connection boxes and the like comprising a small plate having at one end a tongue lying in the plane thereof and lugs projecting laterally therefrom in the same direction from said plate and on opposite sides of the tongue, and a screw extending through the plate and having its end lying on the opposite side thereof from that on which the lugs are located.

2. In combination, a wall having an opening, a conduit extending through said opening, nuts on the conduit on opposite sides of and engaged with said wall, said wall having a small hole therethrough spaced a short distance from said opening, a loose element having a tongue projecting into said opening; and means on said element engaging with one of said nuts and serving to cant said element and cause it to bind in said hole, bite into the nut, and hold the nut against rotation.

3. The combination with a metal wall, a metal conduit passing through a hole in the wall, and nuts screwed on the conduit on opposite sides of and engaged with the wall, of a loose metal piece extending through a hole in the wall near said nuts, a pointed set screw in one end of said metal piece bearing against one of said nuts, shoulders on said metal piece, one engaging the inner side of said wall and the other the outer side of said wall.

4. In combination, a connection box having two knockouts near each other in a wall thereof and a small hole between said knockouts, a loose member having at one end a tongue adapted to be entered in said hole and a lug adapted to engage with the box wall on the side of the hole toward either of the two knockouts, and a screw extending through said member from the side on which said lug is located.

5. A grounding device for use in connection boxes and the like comprising a small plate having at one end a tongue lying in the plane thereof and a lug projecting therefrom transversely of said plane, and a screw extending through said plate from the side on which said lug is located, the lug lying between the screw and the tongue.

ARTHUR I. APPLETON.